United States Patent [19]
Matthews

[11] 3,835,815
[45] Sept. 17, 1974

[54] THERAPEUTIC CONDITIONER FOR HORSES

[75] Inventor: Richard Matthews, Bayshore, N.Y.

[73] Assignee: John Di Maio, Bayshore, N.Y.

[22] Filed: May 23, 1973

[21] Appl. No.: 362,941

[52] U.S. Cl..................... 119/158, 4/185 L, 119/29
[51] Int. Cl............................................ A61d 11/00
[58] Field of Search................ 119/158, 29; 4/185 L

[56] References Cited
UNITED STATES PATENTS

| 2,611,341 | 9/1952 | Paris | 119/158 |
| 3,104,399 | 9/1963 | Dalton | 4/185 L |
| 3,187,350 | 6/1965 | Steven | 4/185 L X |

FOREIGN PATENTS OR APPLICATIONS

| 298,244 | 6/1917 | Germany | 119/158 |

Primary Examiner—Antonio F. Guida
Assistant Examiner—J. N. Eskovitz
Attorney, Agent, or Firm—Kenneth S. Goldfarb

[57] ABSTRACT

A therapeutic conditioner for horses comprising a water fillable open tank and having a hoist and a sling assembly for the purpose of lifting and holding a horse in the tank while the horse swims. Guide ropes extend from the sling assembly to the periphery of the tank and serve to maintain the position of the horse relative to the tank. A tank and a pump are provided for storing and introducing cleaning and medicating solutions into the water in the tank.

4 Claims, 2 Drawing Figures

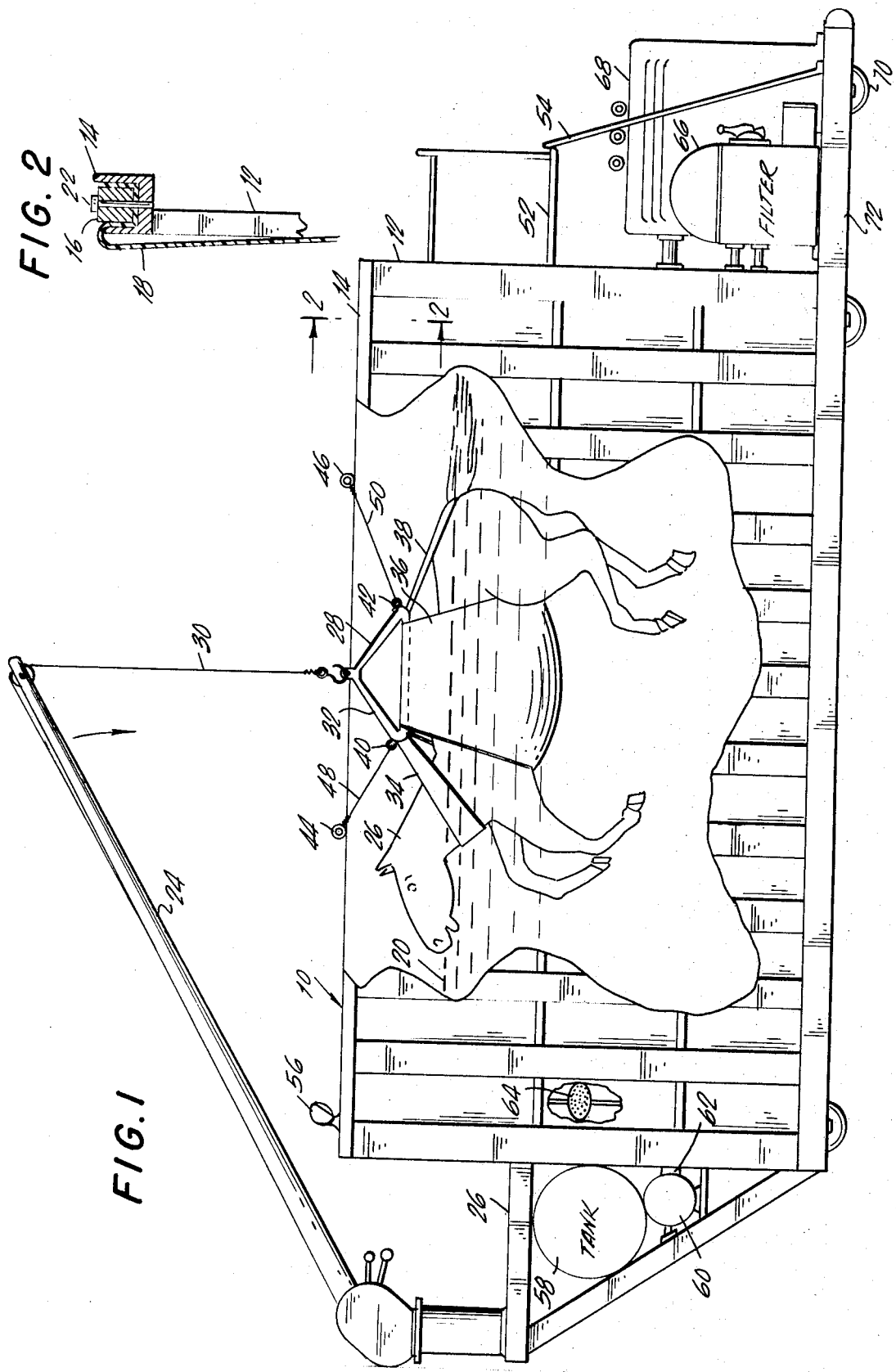

THERAPEUTIC CONDITIONER FOR HORSES

BACKGROUND OF THE INVENTION

1. Field of the Invention

This invention relates to apparatus for the conditioning of animals and more particularly to apparatus for the conditioning of horses.

2. Description of the Prior Art

It has been found advantageous in the conditioning of horses to permit horses to exercise by swimming. However, no effective apparatus for affording this conditioning has heretofore been provided. This practice has been carried out by transporting horses to a river or lake for swimming exercise and controlling the swimming horses from a boat. This practice has several attendant disadvantages including the cost of transportation of the horses from a stable to a natural body of water and the difficulty in locating suitable bodies of water.

SUMMARY OF THE INVENTION

The concept of the invention features the use of a novel apparatus wherein the use thereof will eliminate the need for transporting horses to natural bodies of water for swimming exercise.

The construction of this invention features the use of an apparatus which includes a tank, which is filled with water, combined with hoist and sling means which are adapted for lifting and holding a horse in place relative to the walls of the tank thus permitting the horse to swim in place in the tank.

Still further objects and features of this invention reside in the provision of means for introducing cleaning and medicating fluids into the tank and means for observing the swimming horse at close hand.

These, together with the various ancillary objects and features of this invention, which will become apparent as the following description proceeds, are attained by this apparatus for therapeutic conditioning of horses, preferred embodiments of which are illustrated in the accompanying drawing, by way of example only.

BRIEF DESCRIPTION OF THE DRAWINGS

FIG. 1 is an elevational view of an apparatus constructed in accordance with the concepts of the present invention with a portion of the tank wall shown broken away in order to depict the apparatus in use; and FIG. 2 is a sectional view taken along the plane of line 2—2 in FIG. 1.

DETAILED DESCRIPTION OF THE INVENTION

With continuing reference to the accompanying drawing, wherein like reference numerals designate similar parts throughout the various views, reference numeral 10 is used to generally designate an apparatus for the therapeutic conditioning of horses constructed in accordance with the concepts of the present invention. The apparatus 10 includes a rectangular tank 12 having a peripheral channel 14 which holds channel block 16. Channel block 16 holds a plastic liner 18 which is filled with water 20. A plurality of bolts one of which is shown as bolt 22 attaches channel block 16 to tank 12 and clamps plastic liner 18 in place.

Hoist 24 is provided for the purpose of lifting a horse 26 into tank 12 and holding the horse 26 in the tank 12 as shown in FIG. 1. Hoist 24 is mounted on support member 26 which is attached to tank 12. The water 20 in tank 12 adds to the overall weight of the tank and the overall weight of the tank serves to counterbalance the lifting force exerted by the hoist 24 and thus eliminates the need for a separate counterbalance weight on the hoist 24.

Sling assembly 28 is attached to cable 30 which extends from hoist 24. The sling assembly 28 includes lifting bar 32 and belts 34, 36 and 38 which are removably attached to bar 32. Belts 34 and 38 are relatively narrow and pass around the chest and the haunches of horse 26, respectively. Belt 36 is relatively wide and passes around the belly of the horse 26 and supports the horse 26. Rings 40 and 42 are attached to bar 32. Rings 44 and 46 are attached to tank 12 and guide ropes 48 and 50 extend from rings 40 and 42 on the sling assembly 28 to the tank wall. Guide ropes 48 and 50 serve to restrain horse 26 and maintain the position of the horse 26 relative to tank 12 while the horse 26 is swimming. It is to be understood that an additional pair of rings, similar to rings 44 and 46 are mounted on the rear wall of tank 12 on the portion of the wall shown broken away in FIG. 1 and an additional pair of guide ropes extend from the sling assembly 28 to these rings.

Platform 52 and ladder 54 are provided for the purpose of observing the horse 26 while swimming. Observation of the legs of the horse is facilitated through use of spotlight 56 which is mounted on tank 12 and is directed toward the water 20. Tank 58 and pump 60 are mounted on the outside of tank 58 and are connected by pipe 62 with tank inlet 64 for the purpose of storing and introducing cleaning and medicating fluids into the water 20.

Filter 66 and pump 68 are provided for the purpose of filtering the water in tank 12 and filling the tank 12. Wheels 70 are provided on base portion 72 for the purpose of moving the apparatus 10 to convenient locations.

A latitude of modification, substitution and change is intended in the foregoing disclosure and in some instances, some features of the invention will be employed without a corresponding use of other features.

I claim:

1. A therapeutic conditioner for horses comprising a rectangular tank having an open top, said tank including, a rectangular box having a peripheral channel portion, a liner formed of plastic sheet lining said box and extending into said channel portion, a channel block fitted in said channel over said liner and clamping said liner to said box, said channel block having a plurality of holes, a plurality of bolts disposed one each in said plurality of holes and extending into walls of said channel for the purpose of clamping said channel block to said channel, pipe means for filling said tank with water, hoist means mounted on said tank, sling means attached to said hoist means for the purpose of lifting and holding a horse in said tank and a plurality of ropes extending from said sling to the periphery of said tank for the purpose of maintaining the position of a horse relative to said tank while the horse is swimming, said sling means including a lifting ring attached to said hoist means, a first belt removably attached to said lifting ring for passing around the chest of a horse, a second belt removably attached to said lifting ring for passing around the belly of a horse and a third belt removably attached to said lifting ring for passing around the haunches of a horse.

2. A therapeutic conditioner for horses according to claim 1, wherein filter means are mounted on an outside wall of said tank for the purpose of filtering the water in said tank.

3. A therapeutic conditioner for horses according to claim 2, wherein a spotlight is mounted on the periphery of said tank and is directed toward the water in said tank for the purpose of facilitating observation of the legs of a horse while swimming.

4. A therapeutic conditioner for horses according to claim 3, wherein pump means and tank means are mounted on an outside wall of said tank for the purpose of storing and adding cleaning and medicating fluids to the water in said tank.

* * * * *